US012509209B2

(12) United States Patent
Lieven et al.

(10) Patent No.: US 12,509,209 B2
(45) Date of Patent: Dec. 30, 2025

(54) ASSEMBLY FOR REINFORCING THE FUSELAGE OF AN AIRCRAFT WHEN REMOVING A REMOVABLE PANEL

(71) Applicant: Airbus Operations SAS, Toulouse (FR)

(72) Inventors: Patrick Lieven, Toulouse (FR); Anthony Mertes, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 0 days.

(21) Appl. No.: 19/009,271

(22) Filed: Jan. 3, 2025

(65) Prior Publication Data

US 2025/0229889 A1    Jul. 17, 2025

(30) Foreign Application Priority Data

Jan. 15, 2024 (FR) ...................................... 2400358

(51) Int. Cl.
*B64C 1/12* (2006.01)
*B64C 1/14* (2006.01)

(52) U.S. Cl.
CPC .............. *B64C 1/12* (2013.01); *B64C 1/1446* (2013.01)

(58) Field of Classification Search
CPC ....... B64C 1/12; B64C 1/1446; B64C 1/1461; B64C 1/1484; B64C 1/1492; B64C 1/36; B64D 29/08
See application file for complete search history.

(56) References Cited

U.S. PATENT DOCUMENTS

| 8,777,159 B2* | 7/2014 | Cruz Dominguez ... B64C 1/064 244/119 |
| 11,198,499 B2* | 12/2021 | Dierksmeier .......... B64D 29/00 |
| 2010/0327113 A1 | 12/2010 | Márquez et al. |
| 2018/0222567 A1 | 8/2018 | López et al. |
| 2023/0406476 A1 | 12/2023 | Mertes et al. |

FOREIGN PATENT DOCUMENTS

| CN | 116654240 A | 8/2023 |
| EP | 4296157 A1 | 12/2023 |
| FR | 3109365 A1 | 10/2021 |

OTHER PUBLICATIONS

French Search Report for corresponding French Patent Application No. 2400358 dated Aug. 19, 2024.

* cited by examiner

*Primary Examiner* — Nicholas McFall
(74) *Attorney, Agent, or Firm* — Greer, Burns & Crain Ltd.

(57) ABSTRACT

An assembly for reinforcing a fuselage of an aircraft, the aircraft including a fuselage including an opening and a removable panel received in the opening. The assembly including a first support fixed to an exterior face of the fuselage around and outside an opening in the fixed fuselage. A sub-assembly is to an exterior face of the removable panel and housed inside the first support. The first support is fixed to the fuselage. The sub-assembly is fixed to the removable panel.

8 Claims, 6 Drawing Sheets

ASSEMBLY FOR REINFORCING THE FUSELAGE OF AN AIRCRAFT WHEN REMOVING A REMOVABLE PANEL

CROSS-REFERENCES TO RELATED APPLICATIONS

This application claims the benefit of French Patent Application Number 2400358 filed on Jan. 15, 2024, the entire disclosure of which is incorporated herein by way of reference.

FIELD OF THE INVENTION

The present invention concerns an assembly for reinforcing the fuselage of an aircraft when the aircraft includes a fuselage including an opening and a removable panel intended to be removably fixed into the opening in the fuselage. An assembly of this kind is used when removing the mobile panel from the fuselage. The invention also concerns an aircraft on which such an assembly is mounted and a method of removing the removable panel from the fuselage.

BACKGROUND OF THE INVENTION

At present, to store kerosene an aircraft includes tanks that are classically housed in the wings. To limit pollution it has been envisaged to change the fuel and to use liquid or gaseous dihydrogen. To store the dihydrogen it is planned to use tanks that are housed in the fuselage of the aircraft.

To carry out maintenance of these tanks if necessary to be able to access them easily to possibly remove them if necessary or at least periodically. To this end it is necessary to remove a removable panel from the fuselage on the aircraft. Given the dimensions of the tanks, such a removable panel has an area exceeding 20 m$^2$.

It is thus necessary to provide a solution enabling easy fitting and removal of a removable panel enabling access to the tanks while achieving structural continuity of the fuselage and the removable panel when the removable panel is removed from the fuselage.

SUMMARY OF THE INVENTION

An object of the present invention is to propose a reinforcing assembly enabling a removable panel to be removed simply, rapidly and safely from a fuselage of an aircraft.

To this end there is proposed an assembly for reinforcing a fuselage of an aircraft, said fuselage including an opening and a removable panel intended to be received in said opening, said assembly including:
- a first support intended to be fixed to an exterior face of the fuselage around and outside said opening;
- a sub-assembly including a second upper beam, a second lower beam and at least two crossmembers connecting said upper and lower beams, said second upper beam and said second lower beam being intended to be fixed to an exterior face of said removable panel and said sub-assembly being housed inside said first support;
- first means for fixing said first support to said fuselage; and
- second means for fixing said sub-assembly to said removable panel.

Use of such an assembly makes it possible to support and to reinforce the fuselage and the removable panel in order to prevent them from being weakened or even deformed when removing the removable panel from the opening. In this way it is also possible to reduce the mass of the fuselage of the aircraft since it is not necessary to use on the airframe reinforcing elements at the level of the opening and the removable panel, this reinforcement being obtained by the assembly that is fixed to the aircraft only when a maintenance operation on the ground is necessary.

Said first support advantageously includes first fixing elements extending from a periphery of said first support to the exterior of said first support, said first fixing means including first brackets intended to be fixed to formers and/or stringers of said fuselage situated on an interior face of said fuselage, and said first fixing elements being fixed to said first brackets.

In accordance with a variant of this embodiment said first support includes first fixing elements extending from a periphery of said first support to the exterior of said first support, said first fixing means including cross dowel barrels intended to be housed in first fixing holes in the former and/or the stringers of said fuselage situated on an interior face of said fuselage, said first fixing elements being fixed to said cross dowel barrels.

In accordance with one particular aspect said second upper and lower beams each include second fixing elements extending from said second upper and lower beams in the direction of the respective other second beams, said second fixing means including second brackets intended to be fixed to beams of said removable panels situated on an interior face of said removable panel and said second fixing elements being fixed to said second brackets.

In accordance with a variant of this embodiment said second upper and lower beams each include second fixing elements extending from said second upper and lower beams in the direction of the respective other second beam, said second fixing means including cross dowel barrels intended to be housed in second fixing holes in the beams of said removable panel situated on an interior face of said removable panel and said second fixing elements fixed to said cross dowel barrels.

In accordance with another particular aspect said sub-assembly is mounted to be mobile in rotation relative to said first support.

In accordance with a further particular aspect the assembly further includes a handling support intended to be fixed to said interior face of said removable panel by third fixing means, said handling support including at least one handling element intended to be fixed to a handling machine.

The invention also concerns an aircraft including:
- a fuselage including a skin and formers and stringers fixed to an interior face of the skin, said fuselage including an opening, each former and each stringer being interrupted at one of their ends at the level of an edge of the opening;
- a removable panel intended to be received in said opening in the fuselage, said removable panel including a skin and beams fixed to an interior face of the skin, each beam being interrupted at its ends at the level of an edge of the removable panel;
- an assembly as described above in which said first support is fixed to an exterior face of the fuselage around and outside said opening by the first fixing means and in which said sub-assembly is fixed to an exterior face of said removable panel by the second fixing means and said sub-assembly is housed inside said first support.

The invention also concerns a method of removing a removable panel from a fuselage of an aircraft as described above, the method including the steps of:

fixing by means of the first fixing means the first support of the assembly to the exterior face of the fuselage around and outside said opening;

fixing by means of the second fixing means the second upper beam and the second lower beam of the sub-assembly of the assembly to the exterior face of said removable panel, the sub-assembly being housed inside said first support;

unfastening/unlocking the removable panel from said fuselage;

removing the sub-assembly.

BRIEF DESCRIPTION OF THE DRAWINGS

The features of the invention referred to hereinabove and others will become more clearly apparent on reading the following description of one embodiment and its variants, said description being given with reference to the appended drawings, in which.

DETAILED DESCRIPTION OF THE PREFERRED EMBODIMENTS

Figure 1:
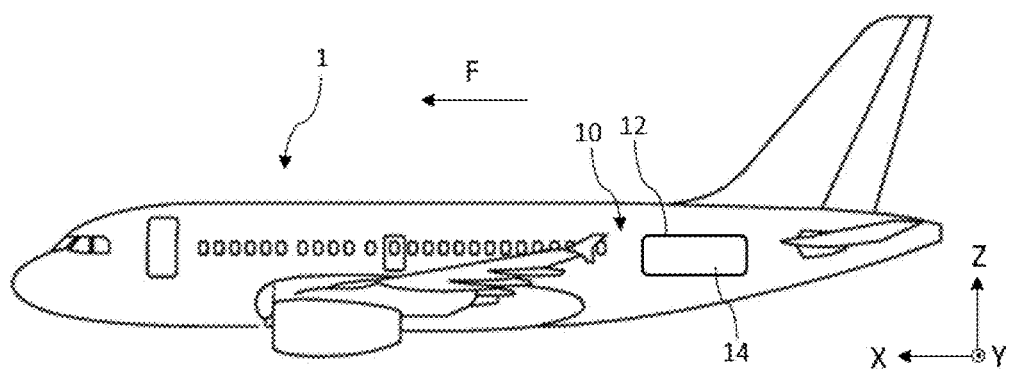
FIG. 1 is a side view of an aircraft according to the invention.

FIG. 1 shows an aircraft 1 that includes a fuselage 10 of cylindrical overall shape and a removable panel 14 removably fixed into an opening 12 in the fuselage 10. In the embodiment of the invention shown in FIG. 1 there is only one removable panel 14 but there may be more than one.

Figure 2:
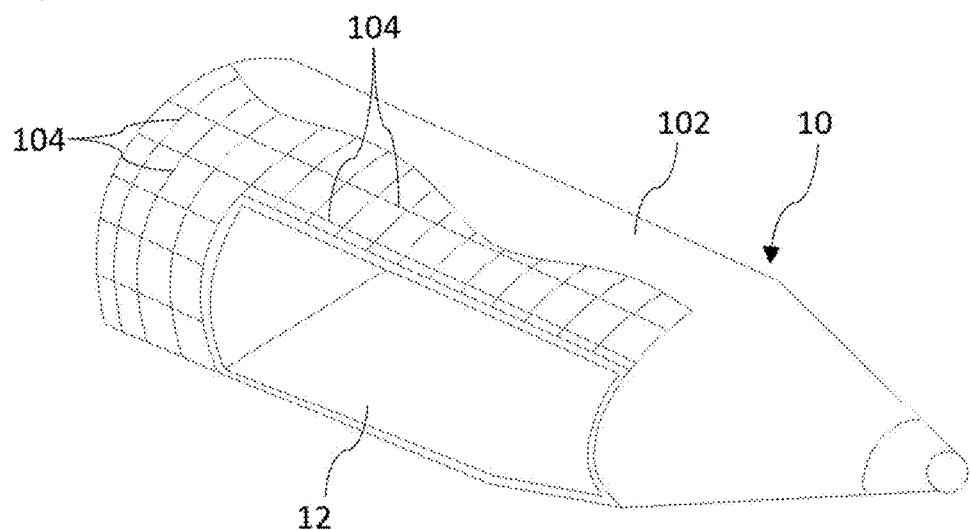
FIG. 2 is a perspective view showing part of a rear fuselage of an aircraft.

FIG. 2 is a perspective view of a rear part of the fuselage 10 of the aircraft 1. The fuselage 10 includes an opening 12 which is here of globally rectangular shape and is intended to receive the removable panel 14 and to be blocked by the removable panel 14 when the latter is in place.

In the following description, and by convention, X is the longitudinal direction of the aircraft 1, Y is the transverse direction that is horizontal when the aircraft 1 is on the ground, and Z is the vertical direction that is vertical when the aircraft 1 is on the ground, these three directions X, Y and Z being mutually orthogonal.

In the following description terms relating to a position refer to an aircraft 1 in the normal flight position, that is to say as represented in FIG. 1, and "front" and "rear" positions refer to the front and the rear of the aircraft 1 relative to its direction of forward movement when its engines are running. The arrow F represents the direction of forward movement of the aircraft 1 in flight.

Figure 4:
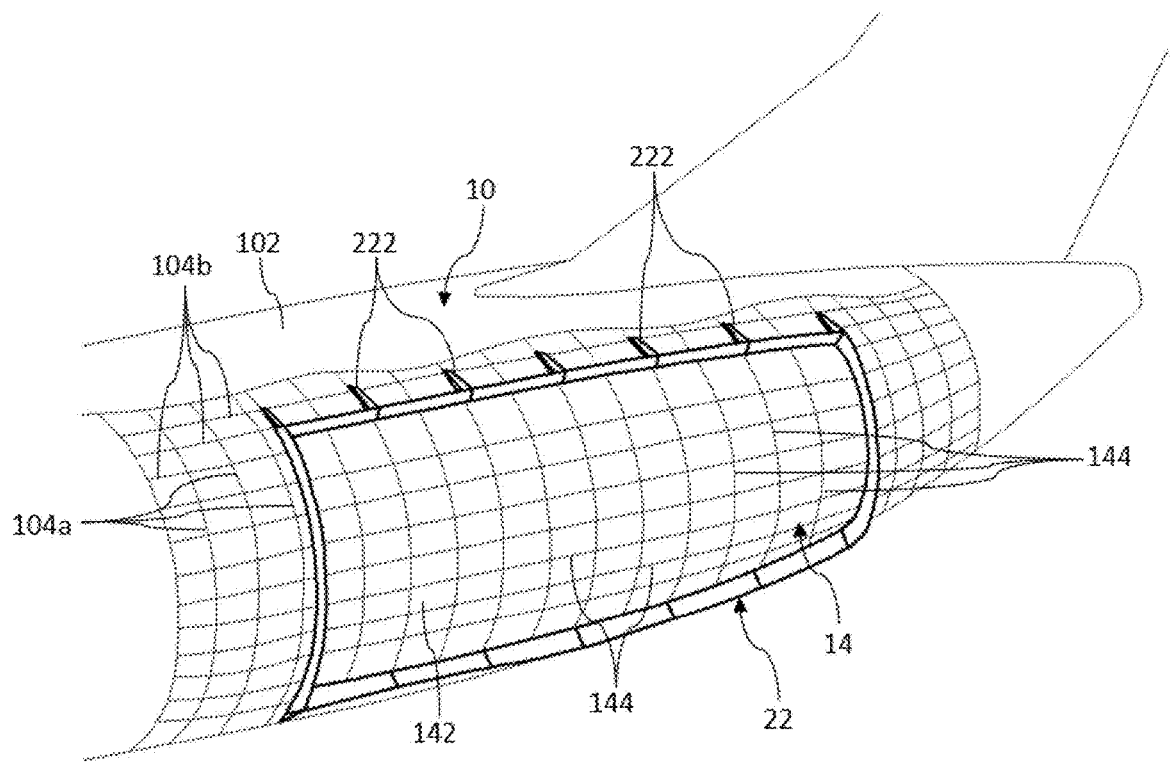
FIG. 4 is a perspective view showing part of a rear fuselage of an aircraft on which the first support from the FIG. 3 assembly is mounted.
Figure 5:
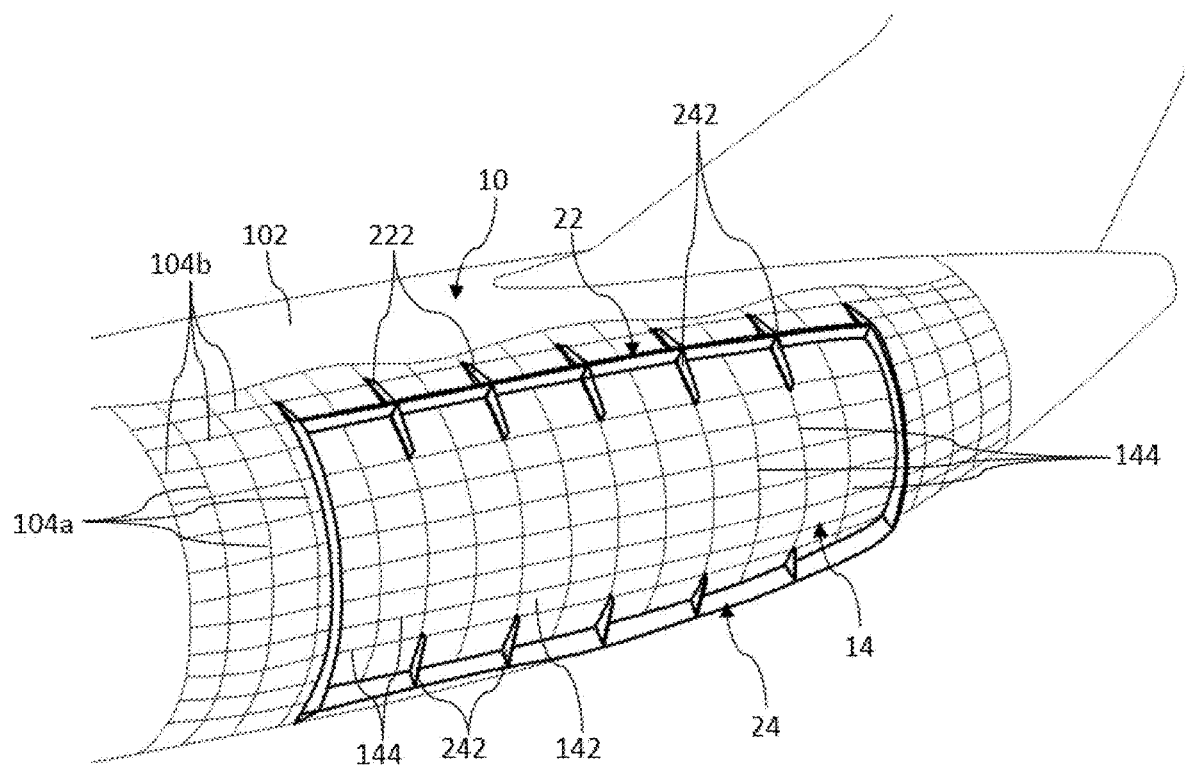
FIG. 5 is a perspective view showing part of a rear fuselage of an aircraft on which the FIG. 3 assembly is mounted.
Figure 6:
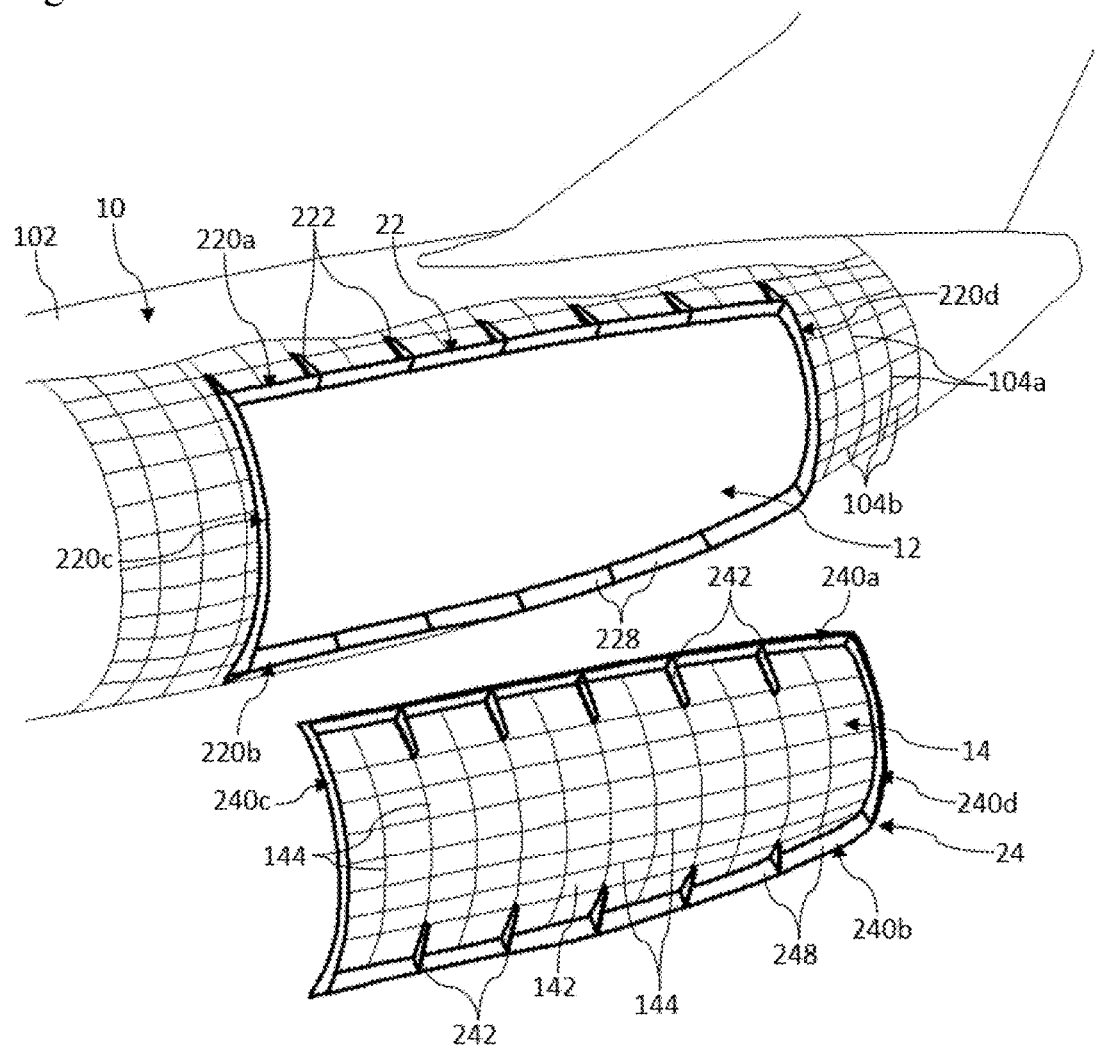
FIG. 6 is a perspective view showing part of a rear fuselage of an aircraft after removing the FIG. 3 sub-assembly.

The fuselage 10 consists of panels that are generally of arcuate shape about a longitudinal axis X. Each panel includes a skin 102 the interior face of which is fixed to formers 104a and stringers 104b. In the embodiment of the invention shown in FIGS. 4 to 6 in particular there are formers 104a each of which is arranged in a vertical plane parallel to the plane YZ and stringers 104b each of which extends parallel to the longitudinal direction X. Each former 104a and each stringer 104b of the fuselage 10 is interrupted at one of its ends at the level of an edge of the opening 12.

As shown here, for each former 104a that is interrupted at the level of an edge of the opening 12 another former 104a is preferably aligned with, that is to say in the same vertical plane as, said former 104a and it is interrupted at the level of the edge of the opening 12. Likewise, for each stringer 104b that is interrupted at the level of an edge of the opening 12 another stringer 104b is aligned with, that is to say in the same horizontal plane as, said stringer 104b and is interrupted at the level of the opposite edge of the opening 12.

The removable panel 14 includes a skin 142 and beams 144 fixed to an interior face of the skin 142 of the removable panel 14. In the same manner as for the fuselage 10 there are beams 144 each arranged in a vertical plane parallel to the plane YZ and beams 144 that each extend parallel to the longitudinal direction X. Each beam 144 of the removable panel 14 is interrupted at one of its ends at the level of an edge of the removable panel 14. As shown here, for each beam 144 that is interrupted at the level of an edge of the removable panel 14 a former 104a or a stringer 104b is preferably aligned with, that is to say in the same vertical or horizontal plane as, said beam 144.

In other words, each end of a beam 144 of the removable panel 14 faces an end of a former 104a or a stringer 104b of the fuselage 10. Thus a beam 144 of the removable panel 14 extends between two formers 104a or two stringers 104b of the fuselage 10 and each end of the beam 144 of the removable panel 14 faces an end of a former 104a or a stringer 104b of the fuselage 10.

Although not depicted, it is obvious that the aircraft 1 includes fixing means that provide a removable fixing between the ends of the formers 104a or the stringers 104b of the fuselage 10 and the ends of the beams 144 of the removable panel 14. The fixing means are not necessarily placed at the level of the end of each former 104a and/or stringer 104b of the fuselage 10, but at the level of the end of at least one former 104a of the fuselage 10 and, depending on the structural strength, other fixing means are placed at the ends of other formers 104a and/or stringers 104b of the fuselage 10.

Figure 3:
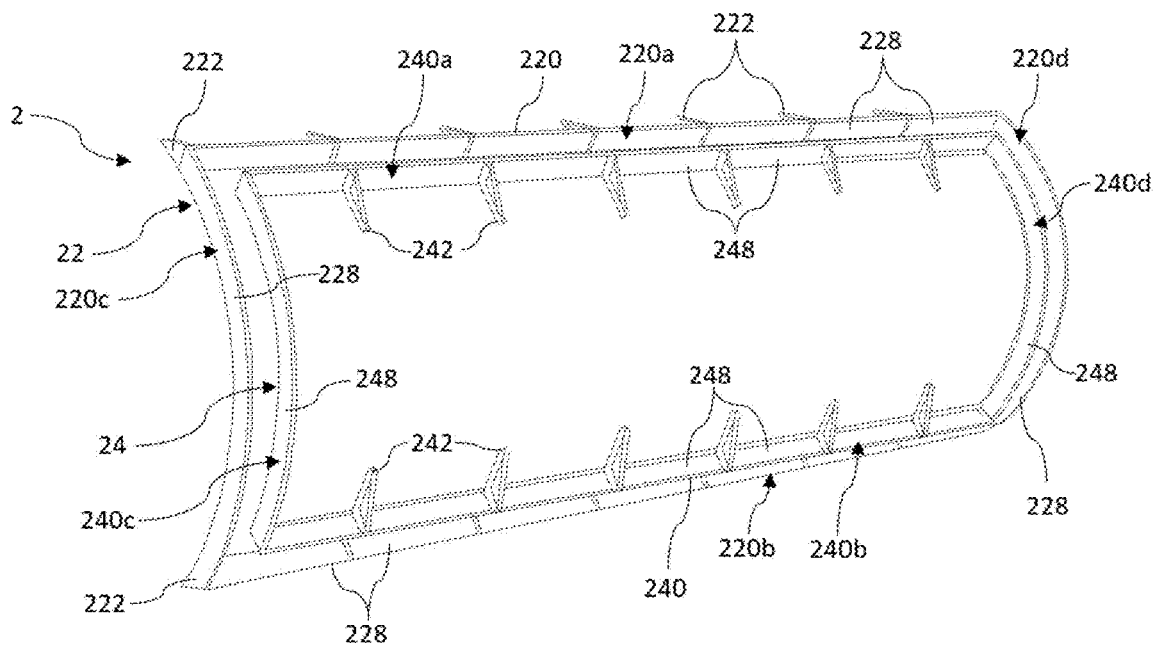
FIG. 3 is a perspective view of an assembly according to the invention.

FIG. 3 depicts an embodiment of an assembly 2 according to the invention. Such an assembly 2 is intended to be mounted on the fuselage of an aircraft 1 in order to reinforce the structure of the latter when the removable panel 14 is removed from the opening 12.

To this end the assembly 2 includes a first support 22 including a first upper beam 220a, a first lower beam 220b and two lateral crossmembers 220c, 220d that connect the first upper beam 220a and lower beam 220b. The first upper beam 220*a* and the first lower beam 220*b* are intended to be fixed to an exterior face of the fuselage 10. The first support 22, which takes the form of a frame, is intended to be fixed around and outside the opening 12.

The assembly 2 further includes a sub-assembly 24 including a second upper beam 240*a*, a second lower beam 240*b* and at least two crossmembers 240*c*, 240*d* connecting the second upper beam 240*a* and lower beam 240*b*. The second upper beam 240*a* and the second lower beam 240*b* are intended to be fixed to an exterior face of the removable panel 14. The sub-assembly 24 is moreover housed inside the first support 22, being fixed at the level of the interior of the opening 12 (that is to say at the level of the removable panel).

The assembly 2 further includes first means 32 for fixing the first support 22 to the fuselage 10 and second means 34 for fixing the sub-assembly 24 to the removable panel 14.

To be more specific, and as depicted in FIGS. 3 to 6, here the opening 12 has a globally rectangular shape. Thus here the first support 22 has a rectangular shape with the first upper beam 220*a* fixed to the fuselage 10 near and above the opening 12. The first lower beam 220*b* is for its part fixed to the fuselage 10 near and below the opening 12. Here the lateral crossmembers 220*c* and 220*d* connect the ends of the first upper beam 220*a* and lower beam 220*b*. The lateral crossmembers 220*c* and 220*d* extend near the lateral edges of the opening 12 and extend over the exterior of the opening 12. Thus the opening 12 is framed by the first support 22 and there is free access to the opening 12.

The first support 22, which is fixed to the fuselage 10 around the opening 12, supports and reinforces the structure of the fuselage 10 in order to stabilize it. Thus the first support 22 prevents the fuselage 10 from being weakened or even deformed when removing the removable panel 14. The longitudinal forces (along the axis X) to which the fuselage 10 is subjected at the level of the opening 12 are absorbed by the first upper beam 220*a* and lower beam 220*b* while the transverse forces (along the axis Z) are absorbed by the lateral crossmembers 220*c* and 220*d*.

In order to optimize the absorbing of transverse forces there may equally be envisaged the optional use of props (not depicted) that bear on the ground and are connected to the first support 22, for example at the level of the lateral crossmembers 220*c* and 220*d*.

Where the sub-assembly 24 is concerned, the second upper beam 240*a* is fixed to the removable panel 14 near and below the opening 12. The second lower beam 240*b* is for its part fixed to the removable panel 14 near and above the opening 12.

In this example the sub-assembly 24 includes two crossmembers 240*c* and 240*d* that connect the ends of the second upper beam 240*a* and lower beam 240*b* to form a second support housed in the first support 22. There could nevertheless be envisaged using a greater number of crossmembers between the second upper beam 240*a* and lower beam 240*b*. It is not essential for the crossmembers to connect the ends of the second upper beam 240*a* and lower beam 240*b*.

The sub-assembly 24, which is fixed to the removable panel 14, supports and reinforces the removable panel 14 in order to prevent it from being weakened or even deformed when it is removed from the rear opening 12. The longitudinal forces (along the axis X) to which the removable panel 14 is subjected are absorbed by the second upper beam 240*a* and lower beam 240*b* while the transverse forces (along the axis Z) are absorbed by the crossmembers 240*c* and 240*d*.

In this way the removable panel 14 can easily be removed from the opening 12 in the fuselage 10 without any risk of the fuselage 10 and/or the removable panel 14 being deformed during maintenance operations.

Use of the assembly 2 according to the invention enables the mass of fuselage 10 of the aircraft 1 to be reduced because it is not necessary to use on the airframe reinforcing elements at the level of the opening 12 and the removable panel 14. In fact, these elements are reinforced by the assembly 2 that is fixed to the aircraft 1 only when a maintenance operation on the ground is necessary.

The first support 22 and the sub-assembly 24 may be made of steel or aluminum for example.

As depicted in FIGS. 3 to 6 and 8 the first support 22 includes first fixing elements 222 extending from a periphery 220 of the first support 22 toward the exterior of the first support 22. The first fixing means 32 include first brackets 322 intended to be fixed to formers 104*a* or stringers 104*b* of the fuselage 10 situated on an interior face of the skin 102 of the fuselage 10. The first fixing elements 222 are fixed to the first brackets 322.

To be more specific the first fixing elements 222, which here take the overall form of a fixing bracket, project from the first upper beam 220*a* and lower beam 220*b*. The first fixing elements 222 extend to the exterior of the first support 22, that is to say in a direction away from the opening 12 or in a direction away from the sub-assembly 24. In other words the first fixing elements 222 extending from the first upper beam 220*a* extend upwards while the first fixing element 222 extending from the first lower beam 220*b* extend downwards. This enables free access to the opening 12 so as to enable the fixing of the sub-assembly 24 to the removable panel 14 and enables removal of the removable panel 14 from the opening 12.

Figure 8:
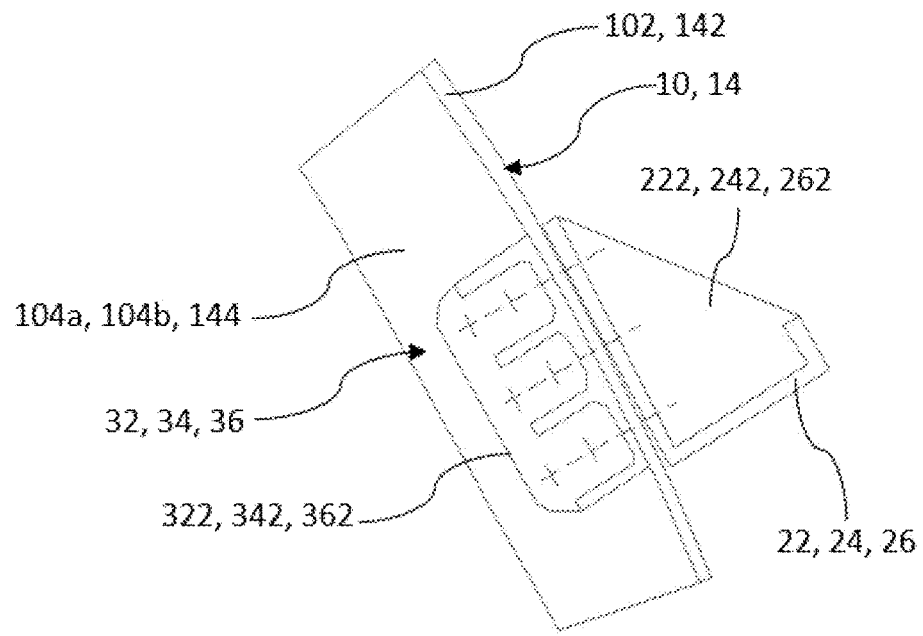
FIG. 8 is a side view depicting one example of fixing the assembly according to the invention to the fuselage of an aircraft.

FIG. 8 shows a first bracket 322 fixed to a former 104*a* of the fuselage 10. The first bracket 322 is fixed to the interior of the fuselage 10, that is to say under the skin 102 of the fuselage 10. The first bracket 322 can be removably fixed to the former 104*a*. The first bracket 322 is fixed to the former 104*a* of the fuselage 10 classically by means of bolts for example. It is obvious that the first bracket 322 could be fixed to a stringer 104*b* of the fuselage 10 without departing from the principle of the invention.

The first fixing element 222 of the first support 22 for its part bears on the exterior face of the fuselage 10, against the skin 102. The first fixing element 222 is removably fixed to the first bracket 322 through the skin 102 of the fuselage 10, for example in the classic way using bolts. A fixing is said to be removable when the two elements can be separated without destroying either of them.

Likewise, the second upper beam 240*a* and lower beam 240*b* each include second fixing elements 242 that extend from the second upper beam 240*a* and lower beam 240*b* in the direction of the respective other second beam 240*a*, 240*b*. In other words the second fixing elements 242 that extend from the second upper beam 240*a* extend in the direction of the second lower beam 240*b* while the second fixing elements 242 that extend from the second lower beam 240*b* extend in the direction of the second upper beam 240*a*. The second fixing means 34 include second brackets 342 fixed, for example removably fixed, to the beams 144 of the removable panel 14 situated on an interior face of the removable panel 14. The second fixing elements 242 are removably fixed to the second brackets 342.

In this example the second fixing elements 242 also takes the form of fixing brackets extending from the second upper beam 240*a* and lower beam 240*b* and coming to bear against the skin 142 of the removable panel 14.

The structural and operating details described hereinabove with reference to FIG. 8 apply equally to the second fixing elements 242 and to the second brackets 342.

The first support 22 and the sub-assembly 24 can therefore be fixed to the fuselage 10 and to the removable panel 14 respectively in an easy, rapid and safe manner.

Figure 9:
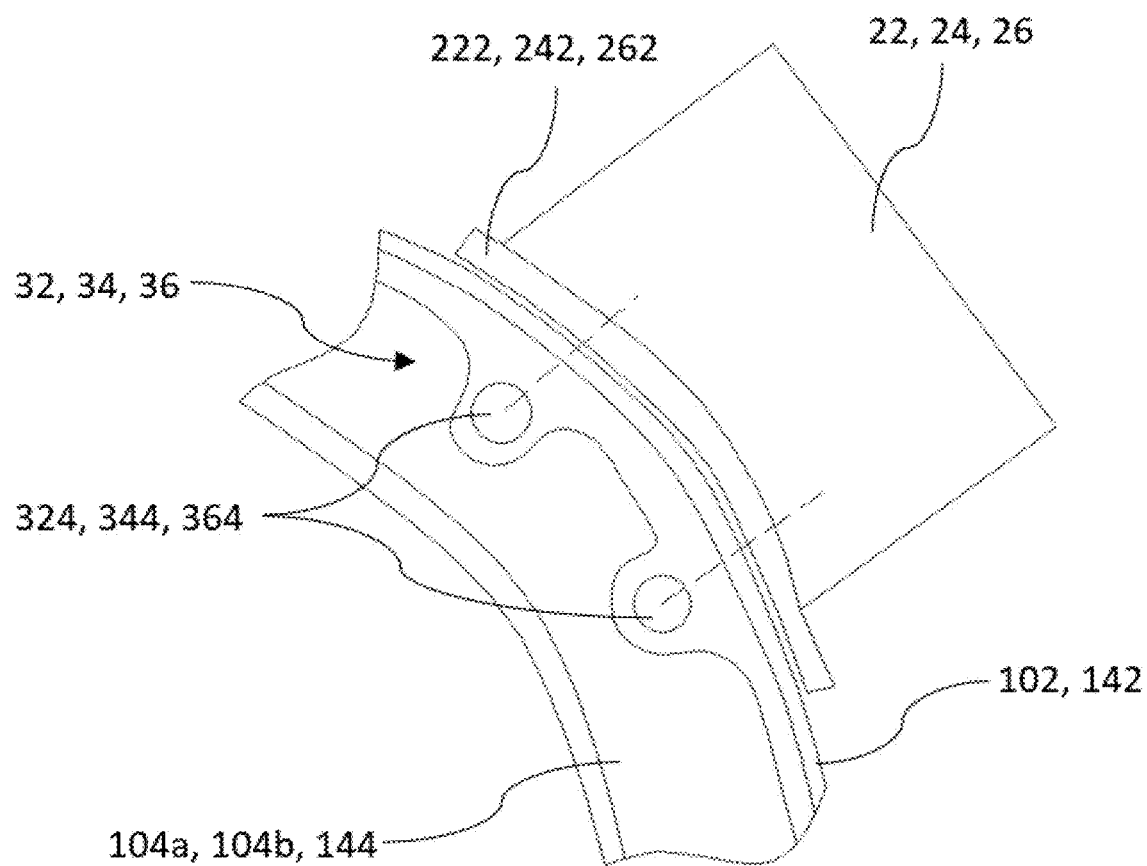
FIG. 9 is a side view depicting another example of fixing the assembly according to the invention to the fuselage of an aircraft.

In a variant embodiment depicted in FIG. 9 the first fixing means 32 of the first support 22 include cross dowel barrels intended to be housed in first fixing holes 324 in the formers 104a of the fuselage 10 situated on an interior face of the fuselage 10. The first fixing elements 222 are fixed to said cross dowel barrels through the fuselage. It is obvious that the first fixing holes 324 could also be in the stringers 104b of the fuselage 10 without departing from the principle of the invention.

Likewise, the second fixing means 34 of the sub-assembly 24 include cross dowel barrels intended to be housed in second fixing holes 344 in the beams 144 of the removable panel 14 situated on an interior face of the removable panel 14. The second fixing elements 242 are removably fixed to the cross dowel barrels through the fuselage.

In this case the formers 104a or the beams 144 include fixing holes 324, 344 in which cross dowel barrels are housed. The fixing holes 324, 344 are provided beforehand on the formers 104a, the stringers 104b or the beams 144 and may for example also constitute fixing points to enable connection with service equipment on the ground or handling equipment on aircraft assembly lines. Fixing bolts (not represented) are intended to pass successively through the first fixing elements 222 or second fixing elements 242, the skin 102, 142 of the fuselage 10 or the removable panel 14, and then to be screwed into the cross dowel barrels in the formers 104a, the stringers 104b or the beams 144.

The first support 22 and the sub-assembly 24 can therefore be fixed to the fuselage 10 and to the removable panel 14 easily, rapidly and safely.

Figure 7:
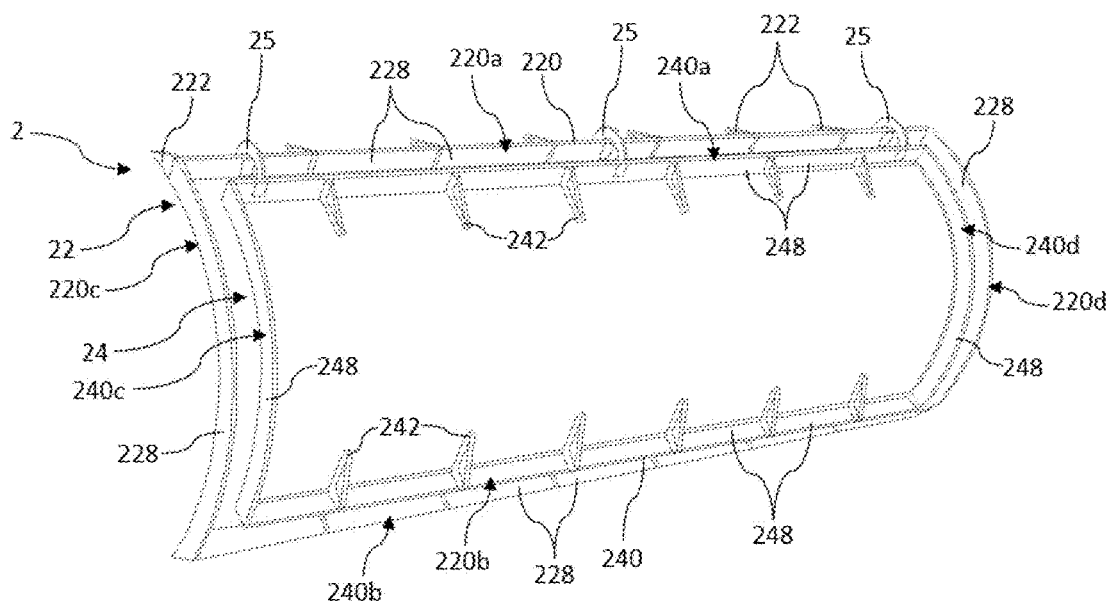
FIG. 7 is a perspective view of a variant of the FIG. 3 assembly.

In an embodiment depicted in FIG. 7 the sub-assembly 24 is mounted to be mobile in rotation relative to the first support 22. To this end the assembly 2 here includes a plurality of hinges 25 that connect the first support 22 to the sub-assembly 24. In this example three hinges are used between the first upper beam 220a and the second upper beam 240a. The sub-assembly 24 therefore pivots upwards to free the opening 12.

This optimizes the operations of handling the removable panel 14. For example, this makes it possible to dispense with the use of a handling machine such as a travelling overhead crane to remove the removable panel 14 from the opening 12.

To facilitate the rotation of the removable panel 14 there may be envisaged using arms and/or (hydraulic or pneumatic) cylinders between the first support 22 and the sub-assembly 24 (for example at the level of the lateral crossmembers 220c and 220d).

Figure 10:
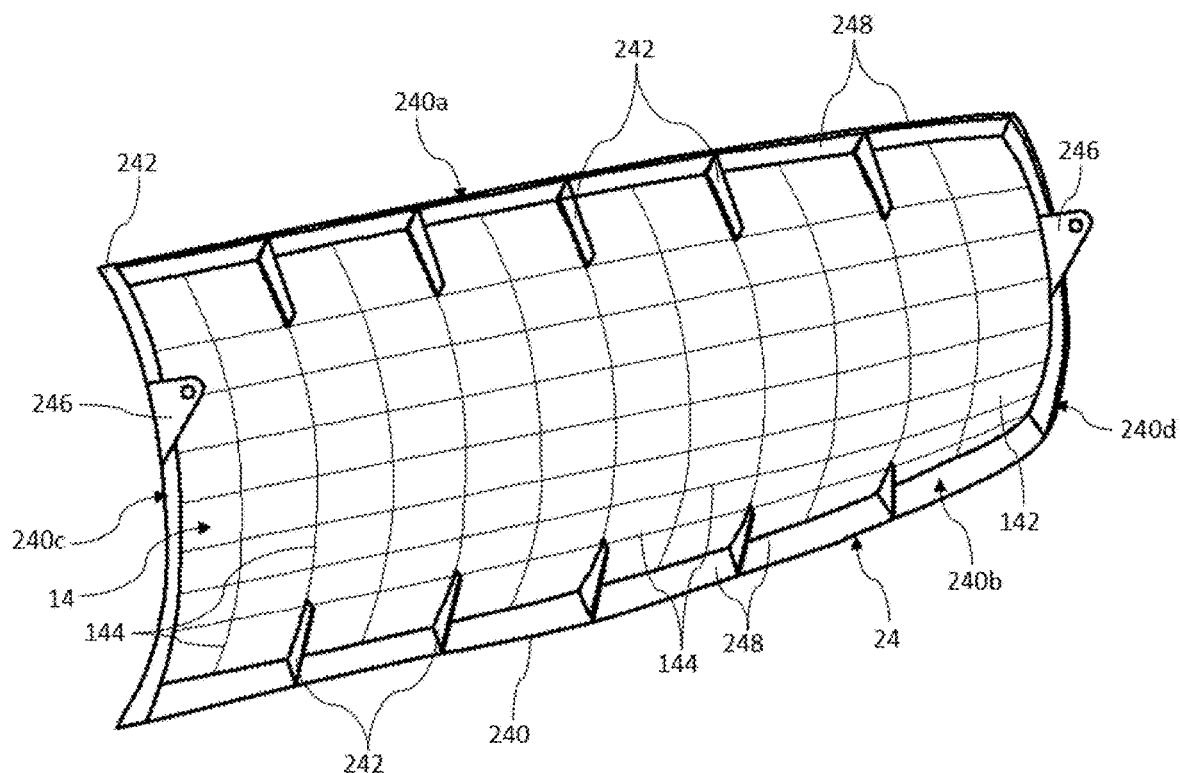
FIG. 10 is a perspective view of one example of a sub-assembly of an assembly according to the invention.

In accordance with one particular aspect depicted in FIG. 10 the sub-assembly 24 includes first handling elements 246 that here are disposed on the crossmembers 240c and 240d. These first handling elements 246 could equally well be disposed on the second upper beam 240a and/or lower beam 240b. Here these first handling elements 246 take the form of lugs including a hole intended to be fixed to a handling machine, such as service equipment on the ground or a travelling overhead crane for example.

The operations of removing and handling the sub-assembly 24 and therefore the removable panel 14 are therefore simplified and made safe.

Figure 11:
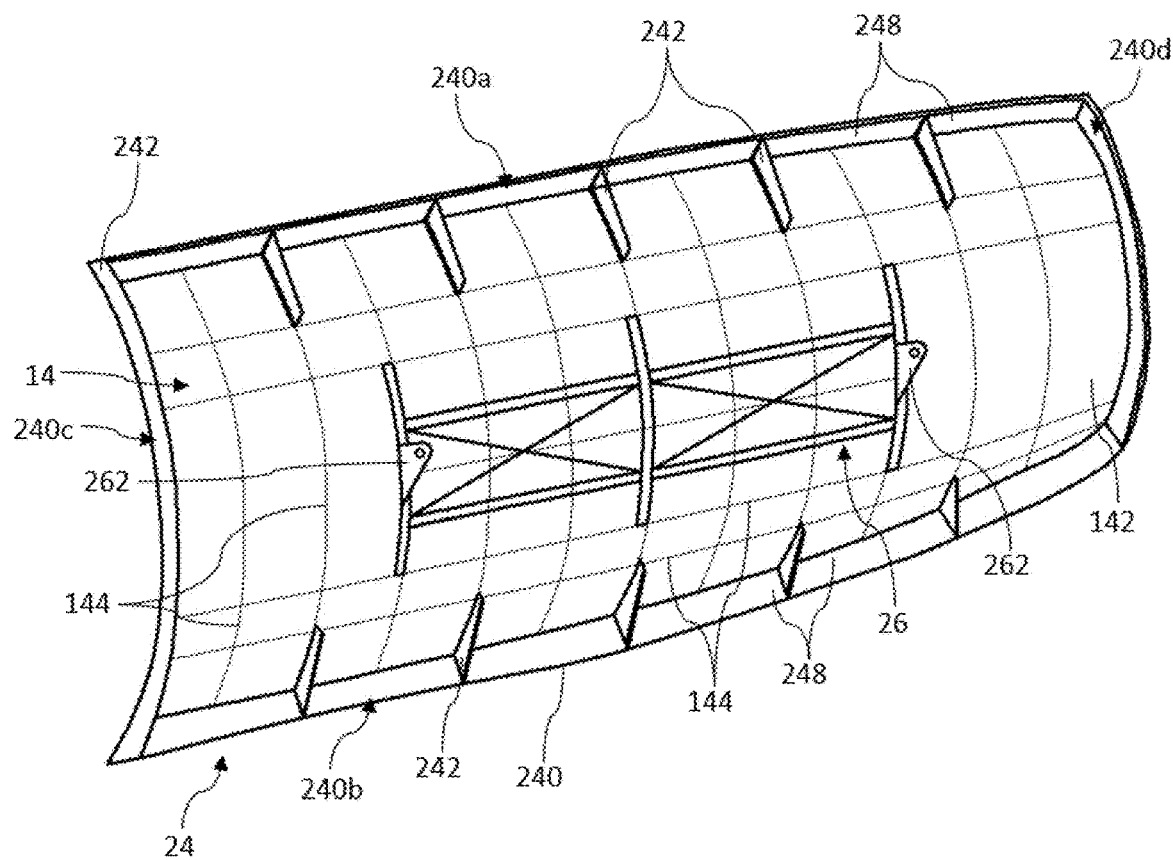
FIG. 11 is a perspective view of a variant of the FIG. 3 assembly.

In a variant embodiment depicted in FIG. 11 the assembly 2 further includes a handling support 26 intended to be removably fixed to the exterior face of the removable panel 14 by third fixing means 36. The handling support 26 includes at least one handline element 262 intended to be fixed to a handling machine, such as service equipment on the ground or a travelling overhead crane for example.

It is obvious that the handling support 26 may include third elements 262 for fixing the handling support 26 to the removable panel 14. The third fixing elements 262 are fixed to the third fixing means 36, which may take the form of third brackets 362 (as depicted in FIG. 8) or cross dowel barrels housed in holes 364 in the beams 144 of the removable panel 14 (as depicted in FIG. 9).

Using such a handling support 26 enables the operations of removing and handling the sub-assembly 24 and therefore of the removable panel 14 to be simplified and made safer.

In the examples depicted in FIGS. 3 to 11 the first support 22 is divided into first sections 228 that are fastened together to form the first support 22. Two adjacent first sections 228 are preferably fastened together at the level of a first fixing element 222.

Likewise, the sub-assembly 24 is divided into second sections 248 that are fastened together to form the sub-assembly 24. Two adjacent second sections 248 are preferably fastened together at the level of a second fixing element 242.

The first support 22 and the sub-assembly 24 can therefore each be divided into a plurality of sections, weighing up to 15 kg each for example, so as to simplify handling them and respectively installing them on the fuselage 10 and on the removable panel 14.

The sections 228 and 248 can be bolted or welded together for example.

In a variant the first support 22 and/or the second support is monobloc, that is to say made in one piece, or at least non-demountable.

Figure 12:
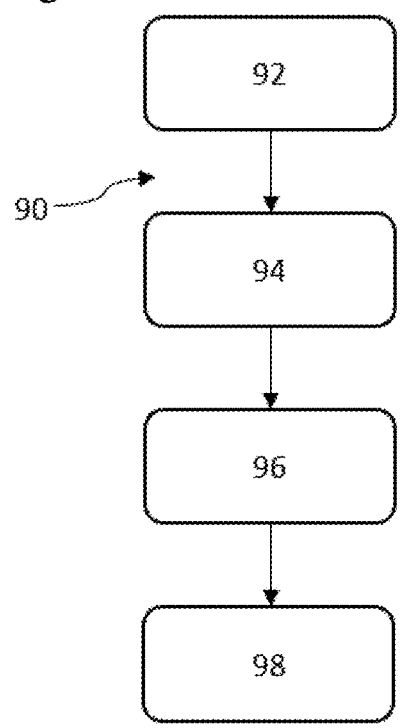
FIG. 12 is a diagram depicting the steps of removing a mobile panel from an opening in a fuselage using an assembly according to the invention.

FIG. 12 depicts schematically the steps of the method 90 of removing a removable panel 14 from a fuselage 10 of an aircraft 1 using an assembly 2 according to the invention. The method 90 includes the steps of:

(step 92) fixing by means of the first fixing means 32 the first support 22 of the assembly 2 to an exterior face of the fuselage 10 around and outside the opening 12;

(step 94) fixing by means of the second fixing means 34 the second upper beam 240a and the second lower beam 240b of the sub-assembly 24 to an exterior face of the removable panel 14, the sub-assembly 24 being housed inside the first support 22;

(step 96) unfastening/unlocking the removable panel 14 from the fuselage 10;

(step 98) removing the sub-assembly 24, enabling removal of the removable panel 14 to which it is fixed from the opening 12.

Such a method 90 enables easy, rapid and safe removal of a removable panel 14 from an opening 12 in a fuselage 10. In fact, fixing the first support 22 to the fuselage 10 around the opening 12 enables the structure of the fuselage 10 to be reinforced around the opening 12 so that removing the removable panel 14 does not lead to weakening or even deformation of the fuselage 10. Furthermore, fixing the sub-assembly 24 to the mobile panel 14 enables the removable panel 14 to be reinforced when it is being removed from the fuselage 10 in order to prevent any weakening or deformation of the removable panel 14. Furthermore, removing the removable panel 14 is facilitated when the sub-assembly 24 includes handling elements 246.

It is clear that to replace the removable panel 14 in the opening 12 it suffices to carry out the steps described above in reverse order, that is to say:

- positioning the sub-assembly 24, enabling repositioning of the removable panel 14 in the opening 12;
- fastening/locking the removable panel 14 onto the fuselage 10;
- demounting the second fixing means 34 to separate the second upper beam 240a and the second lower beam 240b of the sub-assembly 24 from the exterior face of the removable panel 14;
- demounting the first fixing means 32 to separate the first support 22 from the exterior face of the fuselage 10.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft comprising:
   a fuselage including a skin and formers and stringers fixed to an interior face of the skin, said fuselage including an opening, each former and each stringer being interrupted at a respective end at a level of an edge of the opening;
   a removable panel configured to be received in said opening in the fuselage, said removable panel including a skin and beams fixed to an interior face of the skin, each beam being interrupted at ends at the level of an edge of the removable panel;
   an assembly including:
      a first support fixed to an exterior face of the fuselage, said first support being fixed around and outside said opening;
      a sub-assembly including an upper beam, a lower beam and at least two crossmembers connecting said upper beam and said lower beam, said upper beam and said lower beam being fixed to an exterior face of said removable panel and said sub-assembly being housed inside said first support;
   first means for fixing said first support to said fuselage; and
   second means for fixing said sub-assembly to said removable panel.

2. The aircraft as claimed in claim 1, wherein said first support includes first fixing elements extending from a periphery of said first support to an outside of said first support, said first fixing means including first brackets configured to be fixed to formers, or stringers, or both of said fuselage and situated on an interior face of said fuselage and said first fixing elements being fixed to said first brackets.

3. The aircraft as claimed in claim 1, wherein said first support includes first fixing elements extending from a periphery of said first support and to an exterior of said first support, said first fixing means including cross dowel barrels housed in first fixing holes in the formers, or the stringers, or both of said fuselage situated on an interior face of said fuselage and said first fixing elements being fixed to said cross dowel barrels.

4. The aircraft as claimed in claim 1, wherein said lower beam and said lower beam each include second fixing elements extending from said lower beam and said lower beam in a direction of a respective other second beam, said second fixing means including second brackets fixed to beams of said removable panel situated on an interior face of said removable panel and said second fixing elements being fixed to said second brackets.

5. The aircraft as claimed in claim 1, wherein said lower beam and lower beam each include second fixing elements extending from said lower beam and said lower beam in a direction of a respective other second beam, said second fixing means including cross dowel barrels housed in second fixing holes in the beams of said removable panel situated on an interior face of said removable panel and said second fixing elements being fixed to said cross dowel barrels.

6. The aircraft as claimed in claim 1, wherein said sub-assembly is mounted to be mobile in rotation relative to said first support.

7. The aircraft as claimed in claim 1, further comprising:
   a handling support configured to be fixed to said exterior face of said removable panel by third fixing means, said handling support including at least one handling element configured to be fixed to a handling machine.

8. A method of removing the removable panel from the fuselage of the aircraft of claim 1, wherein the method includes the steps of:
   providing the aircraft of claim 1;
   fixing with the first fixing means the first support of the assembly to the exterior face of the fuselage around and outside said opening;
   fixing with the second fixing means the upper beam and the lower beam of the sub-assembly of the assembly to the exterior face of said removable panel, the sub-assembly housed inside said first support;
   unfastening, or unlocking, or both the removable panel from said fuselage; and,
   removing the sub-assembly of the assembly enabling removal of the removable panel.

* * * * *